United States Patent [19]

Loeber et al.

[11] Patent Number: 4,706,723
[45] Date of Patent: Nov. 17, 1987

[54] RIM FOR HEAVY, OFF-ROAD VEHICLES

[75] Inventors: Frederick W. Loeber, Tulsa; Nolan W. Cummins, Bristow; Rodger L. Modglin, Kelleyville; George O. Greene, Glenpool, all of Okla.

[73] Assignee: Unit Rig & Equipment Company, Tulsa, Okla.

[21] Appl. No.: 851,096

[22] Filed: Apr. 14, 1986

[51] Int. Cl.$^4$ .............................................. B60B 25/04
[52] U.S. Cl. ...................................... 152/410; 152/396
[58] Field of Search ................ 152/409, 410, 396, 397, 152/398, DIG. 10; 301/63 R, 95

[56] References Cited

U.S. PATENT DOCUMENTS

| | | | |
|---|---|---|---|
| 2,835,303 | 5/1958 | Woodward | 152/410 |
| 2,894,556 | 7/1959 | Darrow | 152/410 |
| 2,969,825 | 1/1961 | Sinclair et al. | 152/410 |
| 3,783,927 | 1/1974 | Verdier | 152/409 |
| 3,874,736 | 4/1975 | Anderson et al. | 301/63 R |
| 3,913,653 | 10/1975 | Verdier | 152/409 X |
| 4,003,421 | 1/1977 | Lejeune | 152/409 |
| 4,438,797 | 3/1984 | Suckow | 152/410 |
| 4,453,583 | 6/1984 | Smith | 152/410 |

FOREIGN PATENT DOCUMENTS

| | | | |
|---|---|---|---|
| 0158102 | 9/1982 | Japan | 152/409 |
| 2067482 | 7/1981 | United Kingdom | 152/409 |

Primary Examiner—Robert B. Reeves
Assistant Examiner—Russell D. Stormer
Attorney, Agent, or Firm—Head & Johnson

[57] ABSTRACT

An improved rim for use on a heavy, off-road vehicle formed of a tubular rim base member having a circumferential groove in the outer cylindrical surface adjacent one end thereof, the groove being of semi-circular cross-sectional configuration, a first bead flange secured at one end of the rim base member, a second bead flange slidably mounted on the other end of the rim base providing a contour substantially the same as the inner contour of the first bead flange, the second bead flange having a circumferential recess in the inside surface at the outer end thereof, and a split circular cross-sectioned locking ring removably received within the base member circumferential groove so that when the second bead flange is slidably positioned on the rim base, the locking ring can be placed in the groove and when the second flange slides outwardly the recess therein retains the locking ring within the groove and the locking ring serves to retain the second bead flange on the rim. In a preferred embodiment both the first and second bead flanges are substantially identical and the first bead flange is slidably positioned on the rim base and retained in position by an integral increased diameter circumferential seat formed as a part of the rim base, or by welding the first bead flange to the rim base.

5 Claims, 6 Drawing Figures

RIM FOR HEAVY, OFF-ROAD VEHICLES

SUMMARY OF THE INVENTION

This invention relates to improvements in rims for use on off-road vehicles such as vehicles utilized to haul large quantities of earth to construction sites or ore at mining operations. These vehicles typically haul many tons of material at one time and usually over rough surfaces so that, therefore, all parts of the vehicle are subjected to great stress and strain and this is particularly true with respect to the rims on which the vehicle tires are mounted. Since the rims and tires are very large they can be mounted in the same way that on-road vehicles such as cars and truck tires where the tires are stretched over the rims, but attempts by others to do this have proven unsuccessful. Instead, for large off-road vehicles the rims must be constructed in a way so that the tires are mounted without stretching the bead.

Others have devised rim arrangements for off-road vehicles such as revealed in the following U.S. Pat. Nos.: 3,129,034; 2,660,476; 3,468,584; 2,270,918; Re. 27,220; 2,521,260; 4,021,077; 3,421,797; and 2,261,637.

The present invention is directed towards improvement in the state of the art as represented by the present commercially used off-road vehicle rims as well as those exemplified in the prior art such as in the above-referenced patents. The rim of the present invention is formed of a tubular rim base having a first and second end. A first and second circular bead flange is employed. One of the bead flanges is a permanently affixed part of the rim base and the other bead flange is slidably positioned on the outer circumferential surface of the base. The first bead flange is either integrally formed with the rim base or is slidably positioned on the first end of the rim base and welded in position.

In a preferred embodiment both bead flanges are separately formed and slide on the rim base and the bead flanges are preferably substantially identically configured. Each slide-on bead flange has in cross-sectional configuration, a generally flat, horizontal base portion and an integral upstanding radially extending portion. The inside diameter of the base portion is such that the bead flanges can be slidably positioned on the tubular rim base. Each of the bead flanges has at its inner surface, at the outer edge, a circumferential recess. This recess is employed with the first bead flange when in position on the rim base, to receive a weld so that the first bead flange becomes integrally affixed to the rim base. A split, circular, cross-sectioned, lock ring is received in the circumferential groove after the second bead flange is slidably positioned on the rim base. When the second flange is moved outwardly, such as when a tire mounted on the rim is inflated, the recess in the bead flange traps the lock ring in position within the semi-circular groove so that the lock ring is prevented from escaping from the groove. In like manner the lock ring retains the second bead flange in position on the rim.

The use of a circular lock ring in a semi-circular recess greatly improves the performance over existing rims in that the stress load of the lock ring against the rim is more equally distributed to thereby reduces the chance of fatigue failure of the rim or its parts.

By the employment of identical, or substantially identical first and second bead flanges the economy of construction of the rim is greatly improved and the circular lock ring lends itself to economy of construction.

A better understanding of the invention will be had by reference to the following description and claims, taken in conjunction with the attached drawing.

DESCRIPTION OF PREFERRED EMBODIMENT

Figure 1:
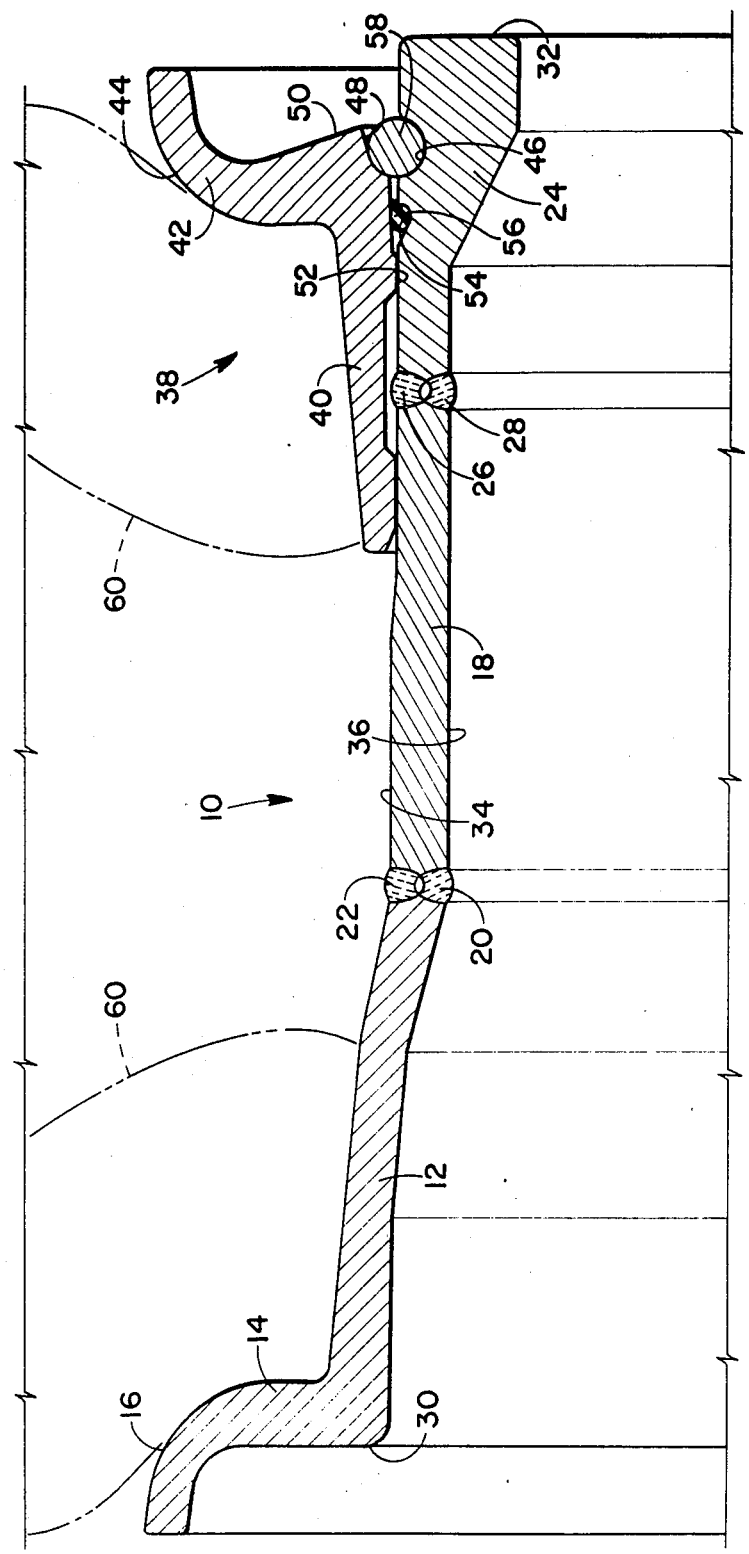
FIG. 1 is a cross-sectional view of a rim according to this invention, the rim being intended for use on large off-road vehicles.

Referring to the drawings, FIG. 1 shows one embodiment of the invention and is a fragmentary cross-sectional view of a rim for use on off-road vehicles. The rim is formed of a rim base member generally indicated by the numeral 10. In the illustrated arrangement the rim base member is fabricated of three portions. The first portion indicated by the numeral 12 includes an integral, circumferential, bead flange portion 14 providing a contoured inner tire engaging surface 16. A second, or intermediate rim base portion 18 is welded at 20 and 22 to the first rim base portion 12. The third or outer rim base portion 24 is welded at 26 and 28 to the intermediate rim base portion 18. Thus, the three portions 12, 18, and 24 are welded together to form an integral rim base member 10 having an inner end 30 and an outer end 32 and having an outer surface 34 and an inner surface 36.

Slidably positioned on the rim base member 10 is a second bead flange portion generally indicated by the numeral 38. The second bead flange 38 includes a first base portion 40 which is generally straight and horizontal in cross-section, and an integral, radially extending portion 42 which provides an inner tire engaging contour surface 44 of substantially the identical shape of the inner contour surface 16 of bead flange portion 14.

Formed in the rim base member outer surface 34 adjacent the outer end 32 is a semi-circular groove 46. The second bead flange 38 includes a circumferential recess 48 which is at the flange outer end 50 and inner surface 52.

Spaced from the semi-circular groove 46 is a smaller depth circumferential groove 54 which receives an O-ring 56. The function of O-ring 56 is to retain air within a tire placed on the rim.

Received in the semi-circular recess 46 is a split, circular, lock ring 58 of circular cross-sectional configuration.

When a tire is to be mounted on the rim 10 the second bead flange 38 is removed. The tire is placed on the rim from the outer end 32. The tire is collapsed, that is, does not have any internal air pressure and, therefore, the sidewalls are flexible. The second bead flange 38 is then slidably positioned on the rim from end 32 and inwardly displaced past the groove 54. O-ring 56 is placed in the groove and the lock ring 58 is placed in the semi-circular groove 46. Air can then be applied to the tire which, in FIG. 1, is indicated in dotted outline and identified by numeral 60. As the air pressure expands the sidewalls of the tire outwardly, the second bead flange 38 moves outwardly, sealing against the O-ring 56. The recess 48 engages the lock ring 58 to trap it into position. In turn, the trapped lock ring prevents the further outward sliding displacement of the second flange 38, thereby retaining tire 60 in position on the rim.

The cross-sectional configuration of the lock ring 58 is extremely important. Due to the extremely heavy load and rough terrain over which heavy off-road vehicles subject a rim, great stresses are applied to all portions of the rim. This is particularly true of the lock ring holding the rim in position. With present commercial devices, such as exemplified in the issued U.S. patents previously referenced, lock rings are of irregular cross-sectional configuration sitting in irregular shaped grooves. These irregular shapes cause areas of stress concentration. The present invention overcomes this problem by providing a circular cross-sectioned lock ring sitting in a semi-circular cross-sectioned groove so that the stresses are applied over a wide area free of points of stress concentration. In addition, the circular cross-sectioned lock ring is much more economical to manufacture than lock rings with more complex shapes.

Figure 2:
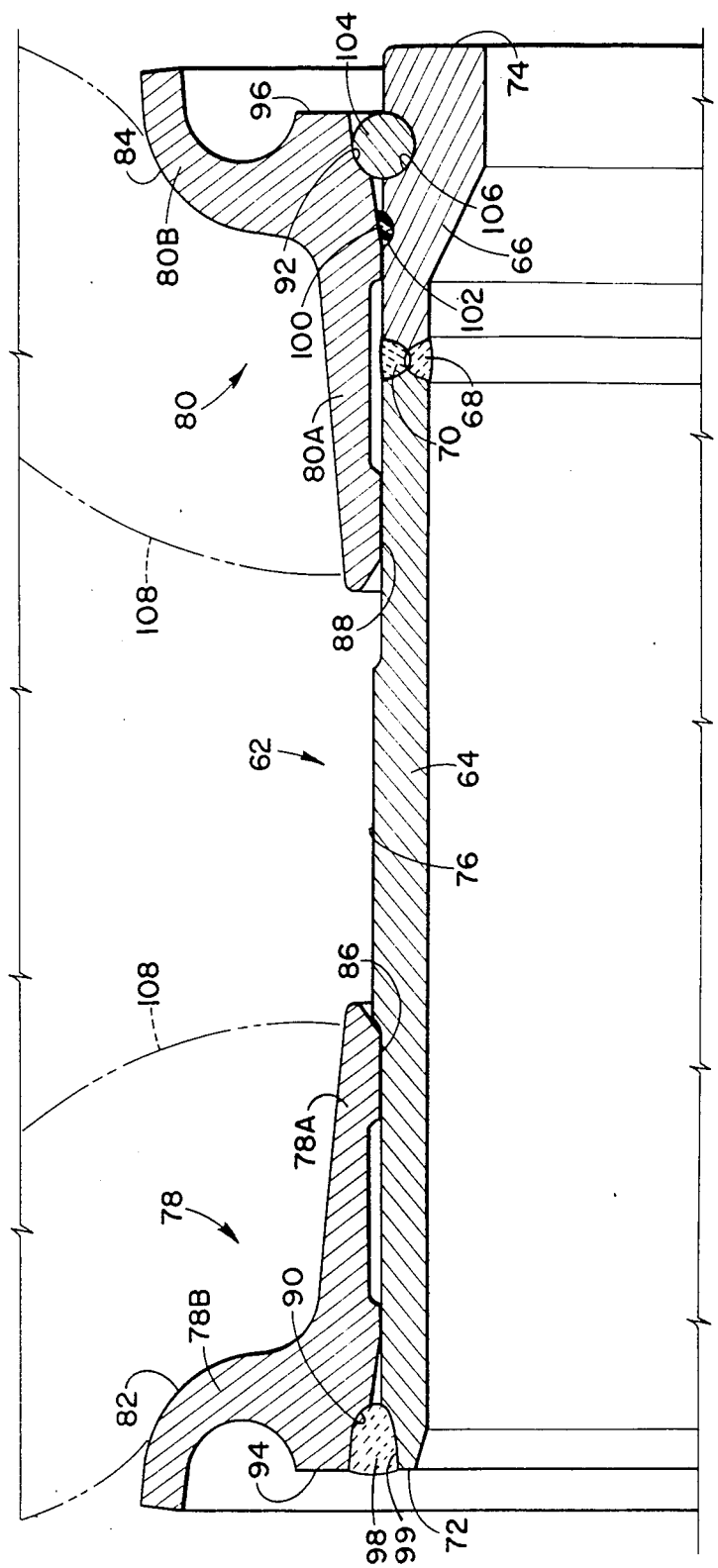
FIG. 2 is a cross-sectional view as in FIG. 1 but showing a more preferred embodiment of the invention wherein two substantially identical bead flanges are employed.

FIG. 2 shows an alternate and preferred embodiment of the invention. In FIG. 2 the rim base member 62 is a generally tubular member formed of a first tubular portion 64 and a second tubular portion 66, the portions being welded together at 68 and 70. The rim base has an inner end 72 and an outer end 74 and a circumferential exterior surface 76. The rim of FIG. 2 employs two bead flange members the first being generally indicated by the numeral 78 and the second by the numeral 80. The members 78 and 80 are substantially identical and preferably are formed from identically made base members which can be machine formed or cast. It can be easily appreciated that by manufacturing a rim wherein the bead flanges 78 and 80 are finished from the same basic structure the overall cost of manufacture is reduced. Each of the bead flanges 78 and 80 includes a first generally straight, horizontal base portion 78A and 80A respectively, and an integral, generally radially extending portion 78B and 80B respectively. These radially extending portions provide tire engaging contour surfaces 82 and 84.

The inner circumferential surfaces 86 and 88 of the bead flanges are of an internal diameter to be slidably received on the exterior surface 76 of the rim base member.

Each of the bead flanges has a circumferential recess 90 and 92 respectively, formed at the juncture of the bottom surfaces 86 and 88 respectively, and the outer ends 94 and 96 respectively.

In manufacturing a rim of FIG. 2 the first bead member 78 is slid into position on the rim base 62 and a weld 98 is applied between the recess 90 and the inner end 72 of the first rim base tubular portion 64. An external circumferential recess 99 is formed on the outer circumference surface 76 of the rim base member 64 at the outer end 72. Recess 99 is opposed to and mates with recess 90 in first bead flange 78 to provide an improved circumferential cavity to receive weld 98. After weld 98 is applied the first bead flange 78 remains permanently affixed to the rim.

The second bead flange 80 functions in the same manner as described with reference to FIG. 1. When a tire is to be installed it is put on the rim uninflated and is pushed inwardly to engage the first bead flange 78. The second bead flange 80 is slid into position on the rim base and pushed inwardly far enough to permit the placement of an O-ring 100 which fits in groove 102. Next the split circular cross-sectional lock-ring 104 is positioned in the semi-circular groove 106. Air pressure can then be applied to the interior of tire 108 expanding the sidewall outwardly against the second bead flange 80, sliding the bead flange towards the rim base outer end 74 trapping the lock ring 104 in place.

The embodiment of FIG. 2 has all of the advantages of the circular cross-sectioned lock ring of FIG. 1, plus the additional advantages of simplicity of construction. As previously indicated, the use of bead flanges having substantially identical configuration has obvious economic advantages. The bead flanges have been described as being of substantially identical cross-sectional configuration since they can vary somewhat. For instance, both bead flanges could be manufactured from the identical castings or forgings with slight changes made during final machining of the inner and outer flanges. For instance, the configuration of the circumferential recesses 90 and 92 may vary. On the other hand, the rim can be manufactured wherein the first and second bead flanges are identical, such as shown in the FIG. 2.

In the arrangement of both of FIGS. 1 and 2 the radial flange portions of the bead flanges can be configured so as to be slightly flexible. This is achieved by carefully designing the configuration of the radial portions which provide the contoured surfaces 16 and 44 of FIG. 1 and 82 and 84 of FIG. 2. By varying the thickness of the flange portions 14 and 42 of FIG. 1 and 78B and 80B of FIG. 2, a degree of flexibility can be achieved so that slight deflections of the radial portions of the bead flanges can take place so this flexibility is optimized for the tire being used, (i.e., bias or radial). Flexibility must be controlled, however, since the bead flange must be sufficiently stiff to minimize chafing between the tire and the rim.

Note that in FIGS. 1 and 2 all of the welds are in areas which are subject to the pressure of the air within tire 108. This means that if a weld breaks or start to break, air will leak from the tire giving an indication that a failure of the rim may be imminent.

Figure 3:
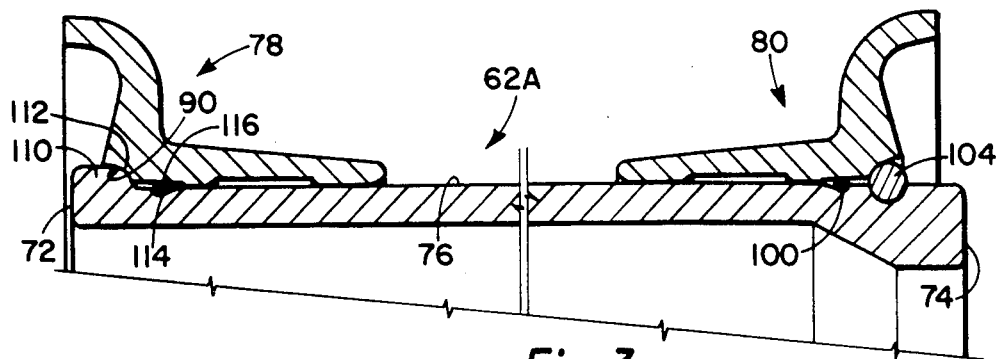
FIG. 3 is a cross-sectional view as in FIGS. 1 and 2 but showing an alternate embodiment of the invention wherein the first bead flange is retained in position by an integral, increased diameter, circumferential seat formed as a part of the rim base member.

Referring now to FIG. 3 an alternate embodiment of FIG. 2 is shown in which the rim base member 62A is formed of a unitary structure and has, at the first end 72 thereof, an enlarged external diameter circumferential seat portion 110. The seat portion 110 has an edge 112 which is configured to matingly receive the recess 90 in the first bead flange member 78.

The rim base member 62A has, on the exterior surface 76, adjacent the bead portion 110, a circumferential small diameter recess 114 which receives an O-ring gasket 116.

The embodiment of FIG. 3 permits the use of substantially identical flanges 78 and 80 as in FIG. 2 but in the arrangement wherein the first flange 78 is removably received on the rim base member. Since the first bead flange 78 must be slid into a position over the first end 74 of the rim base member, the maximum diameter of the exterior surface 76 of the rim base member must be maintained substantially uniform, that is, it can not have any portions between the second end 74 and the seat portion 110 which is greater in exterior diameter than the interior diameters of the bead flange 78. The increased external diameter which provides the circumferential seat portion 110 services to strengthen the rim in the same way that the increased thickness of the rim in the portion adjacent the first end 74 strengthens the rim.

Figure 5:
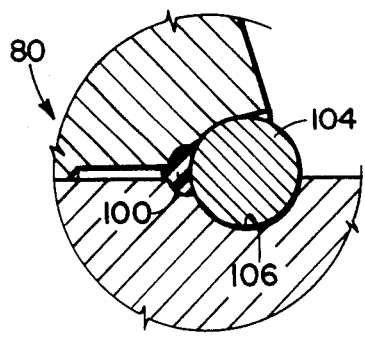
FIG. 5 is a fragmentary cross-sectional view of the embodiment of FIG. 4 when the bead flange and lock ring are in operating positions.
Figure 4:
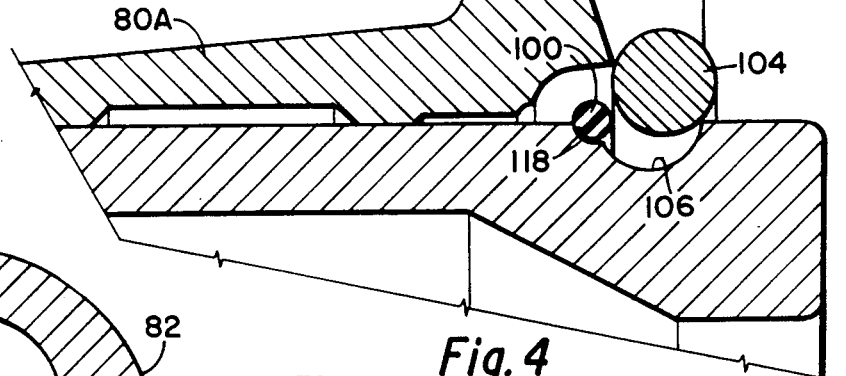
FIG. 4 is a fragmentary cross-sectional view of the rim base adjacent the second end and showing the second bead flange in cross-section and showing an alternate location of an O-ring seal.

FIGS. 4 and 5 show an alternate location for the O-ring gasket 100 as previously described with reference to FIG. 2. A small diameter circumferential groove 118 is provided in the rim base member continguous to the semi-circular groove 106. As shown in FIG. 5, when the second flange 80 and the lock-ring 104 are in position on the rim base member, the O-ring 100 is in sealed engagement with these three members. This means that during the mounting of a tire, if the lock ring 104 is not in proper position and fully recessed within the semi-circular groove 106 so as to be sealably engaged by the O-ring 100 around its full circumference, then the tire will not hold air. This prevents the tire from being fully inflated if the lock ring is not in its correct position accomplishing an important safety advantage.

Figure 6:
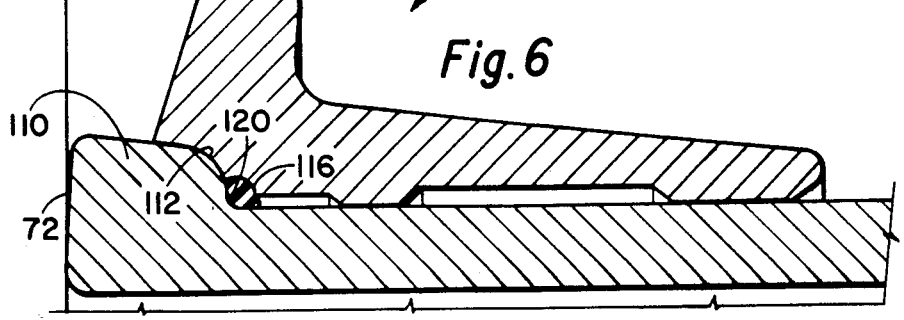
FIG. 6 is a fragmentary cross-sectional view of the first end portion of the rim base member and the first bead flange and showing an alternate location of the O-ring gasket.

FIG. 6 shows a similar arrangement with respect to the first bead flange 78. In this embodiment a small diameter groove 120 is formed in the interior surface of the first bead flange 78 and receives the O-ring gasket 116. This gasket seals against the mating edge 112 of the integral seat portion 110 when the first bead flange is in proper position. In this way the tire can not hold air if the first bead flange is not properly seated with respect to the seat portion 110 of the flange base member.

It can be seen that in the embodiment of FIG. 3 wherein the first and second bead flanges 78 and 80 are both removably supported with respect to the rim base member, that by using the air seal arrangements of FIGS. 4, 5 and 6, a proper installation indication is achieved when the tire is positioned on the rim and retains air. The failure of the tire to properly inflate provides an indication of improper positioning of the elements making up the rim.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A rim for a wheel for use on a heavy, off-road vehicle, comprising:
   a tubular rim base member having a first and a second end and having an inner and outer circumferential surface, the rim base member having a circumferential groove in the outer cylindrical surface adjacent the second end thereof;
   first and second substantially identical circular bead flanges, each having an inner and an outer end and an inside and an outside surface, each having an internal diameter permitting sliding reception onto said rim base member, each having a circumferential recess in said inside surface at said outer end, the first bead flange being received on and welded to said rim base member, the weld being formed in said first bead flange circumferential recess and at said rim base member first end; and
   a split lock ring removably receivable within said rim base member circumferential groove, said second bead flange being received on said rim base member at said second end and said recess in the said inside surface at said outer end thereof, said second bead flange when urged towards said rim base second end engages the lock ring to prevent the lock ring from escaping out of said semi-circular groove, and the lock ring prevents said second bead flange from passing off the second end of said rim base member, said first and second bead flanges being configured to receive the opposed beads of a tire mounted thereon,
   wherein said rim base member has an external circumferential recess in said outer circumferential surface at said inner end, which recess is opposed to said circumferential recess in said first bead flange, said weld being formed in said opposed recessess in said rim base member and said first bead flange.

2. A rim according to claim 1 wherein each of said rim flanges is formed of a circumferential, generally straight, horizontal base portion having an outer and inner surface and an outer and inner end, and an integral, generally radially extending, enlarged, diameter portion having an inner and outer surface, the base portion outer surface and the enlarged diameter portion inner surface forming tire engaging surfaces.

3. A rim according to claim 1 wherein the thickness of said base member is increased in the area having said groove therein.

4. A rim according to claim 1 wherein said rim base member has a small diameter seal groove in the outer surface continuous with said semi-circular groove, and including:
   an elastomeric continuous seal ring received in said seal groove, the seal ring engaging said second bead flange inner surface and said lock ring when in position wherein a tire is received on said rim.

5. A rim according to claim 1 wherein said circumferential groove in said rim base member is of semi-circular cross-sectional configuration and wherein said split lock ring is of circular cross-sectional configuration.

* * * * *